(12) United States Patent
Kataoka

(10) Patent No.: US 6,263,495 B1
(45) Date of Patent: *Jul. 17, 2001

(54) METHOD AND APPARATUS FOR OPTIMIZING STATE TRANSITION TABLE USED FOR EVENT-DRIVEN SOFTWARE

(75) Inventor: Yoshio Kataoka, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,732

(22) Filed: Jun. 18, 1998

(30) Foreign Application Priority Data

Jun. 27, 1997 (JP) ..................................... 9-172151

(51) Int. Cl.[7] ........................................................ G06F 9/45
(52) U.S. Cl. ..................................... 717/10; 717/9; 707/3
(58) Field of Search ................................ 395/710, 709; 709/100, 102, 103, 106; 717/10, 9; 703/17; 707/1, 9

(56) References Cited

U.S. PATENT DOCUMENTS

| 5,371,683 | * | 12/1994 | Fukazawa et al. | 364/489 |
|---|---|---|---|---|
| 5,371,889 | * | 12/1994 | Klein | 395/676 |
| 5,452,215 | * | 9/1995 | Washabaugh | 364/468.04 |
| 5,469,553 | * | 11/1995 | Patrick | 395/750.05 |
| 5,499,374 | * | 3/1996 | Giulio et al. | 710/240 |
| 5,537,580 | * | 7/1996 | Giomi et al. | 395/500 |
| 5,925,114 | * | 7/1999 | Hoang | 710/48 |
| 5,995,739 | * | 11/1999 | Rotbart | 703/17 |
| 6,185,555 | * | 2/2001 | Sprenger | 707/3 |

OTHER PUBLICATIONS

TITLE: An attempt of developing control software for sequence–controlled machine using state transition table, SO Jissen Kyoiku, (1998) vol. 13, No. 1, pp. 32–36. Journal Code: L0045A.*

Title: State Based Model Checking of Event–Driven System Requirements, ACM, 1991.*

* cited by examiner

Primary Examiner—Mark R. Powell
Assistant Examiner—Chameli C. Das
(74) Attorney, Agent, or Firm—Oblon, Spivak, McClelland, Maier & Neustadt, P.C.

(57) ABSTRACT

A state transition history for each state and an event establishment history for each event are gathered and recorded while a parsing and program invoking portion parses a state transition table. A state transition order optimizer determine the order of transitions to other states and an event order optimizer determine the order of event evaluation to minimize the state transition process time. Both optimization can be done according to the state transition history and event establishment history.

12 Claims, 9 Drawing Sheets

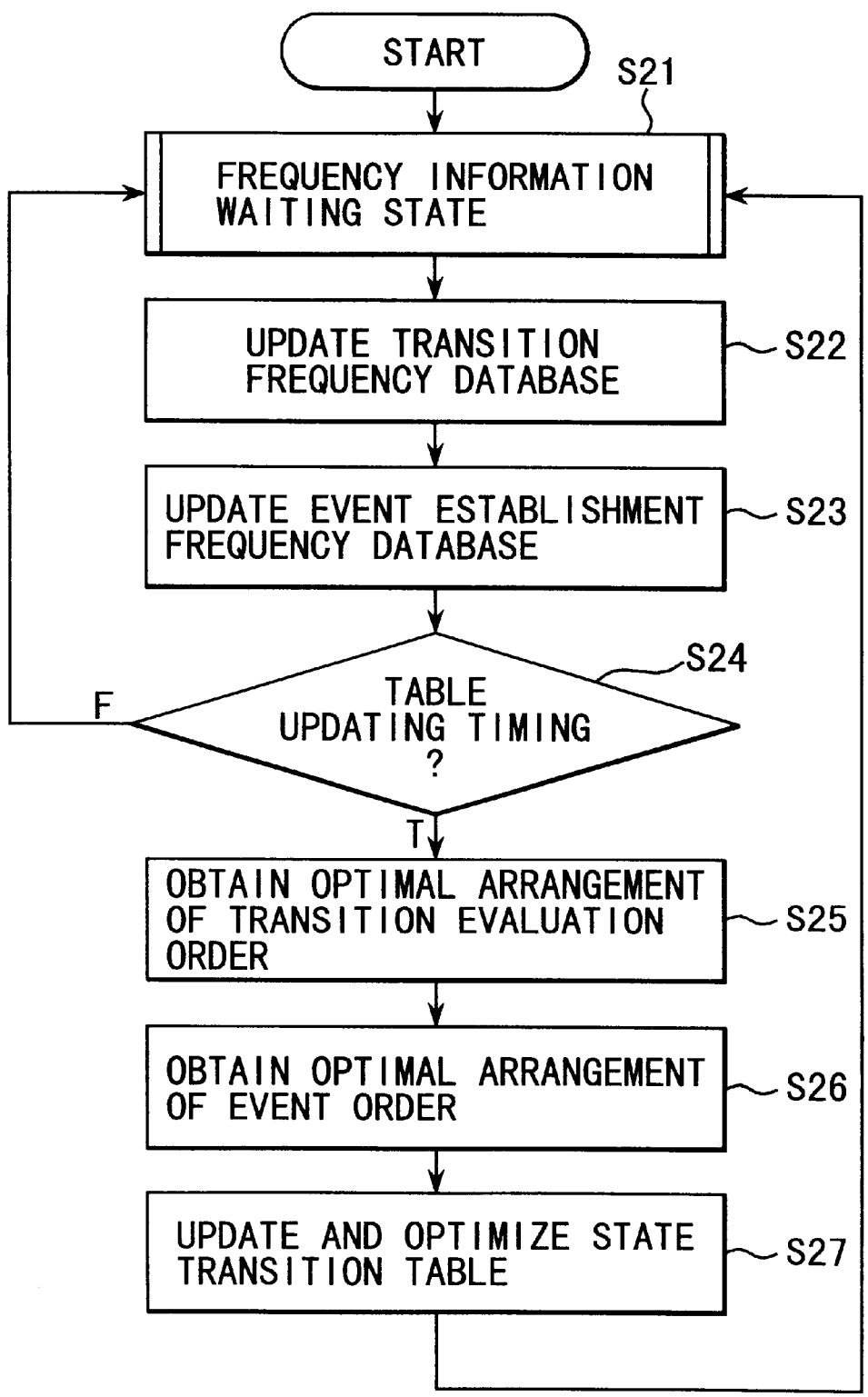
F I G. 3

STATE TRANSITION TABLE::= STATE DEFINITION SEQUENCE;

STATE DEFINITION SEQUENCE::= STATE DEFINITION |
　　　　　　　　　　　　　　　STATE DEFINITION STATE DEFINITION SEQUENCE;

STATE DEFINITION ::= NULL | STATE ID TRANSITION DEFINITION SEQUENCE;

TRANSITION DEFINITION SEQUENCE::= TRANSITION DEFINITION |
　　　　　　　　　　　　　　　　　TRANSITION DEFINITION TRANSITION DEFINITION SEQUENCE;

TRANSITION DEFINITION::= NULL | EVENT DEFINITION SEQUENCE ACTION DEFINITION SEQUENCE
　　　　　　　　　　　　 NEXT STATE ID;

EVENT DEFINITION SEQUENCE::= NULL | EVENT DEFINITION EVENT DEFINITION SEQUENCE;

ACTION DEFINITION SEQUENCE::= NULL | ACTION DEFINITION ACTION DEFINITION SEQUENCE;

FIG. 4

```
STATE 0:

EVENT 0;      ⎫
        EVENT 1;      ⎬ TRANSITION 1
        ACTION 0;     ⎪
        NEXT STATE 1; ⎭

EVENT 2;      ⎫
        EVENT 3;      ⎪
        ACTION 1;     ⎬ TRANSITION 2
        ACTION 2;     ⎪
        NEXT STATE 2; ⎭

EVENT 2;      ⎫
        EVENT 4;      ⎪
        EVENT 5;      ⎬ TRANSITION 3
        ACTION 0;     ⎪
        ACTION 2;     ⎪
        NEXT STATE 3; ⎭

EVENT 2;      ⎫
        EVENT 6;      ⎪
        EVENT 7;      ⎪
        EVENT 8;      ⎬ TRANSITION 4
        ACTION 0;     ⎪
        ACTION 3;     ⎪
        NEXT STATE 4; ⎭

STATE 1:
            ⋮
```

FIG. 5

```
# FORMAT
# STATE ID:
# TRANSITION:OKorNG

STATE 0:
 TRANSITION 1:NG;
 TRANSITION 2:OK;
```

FIG. 6

```
# FORMAT
# EVENT:True or False

EVENT 0:T;
EVENT 1:F;
EVENT 2:T;
EVENT 3:T;
```

FIG. 7

```
# FORMAT
# STATE ID:TOTAL NUMBER OF TIMES EVALUATION
    IS MADE
# TRANSITION:FREQUENCY(NUMBER OF TIMES)

STATE 0:623;
 TRANSITION 1:45;
 TRANSITION 2:342;
 TRANSITION 3:21;
 TRANSITION 4:186;

STATE 1:
```

FIG. 8

```
# FORMAT
# STATE ID:
# EVENT:NUMBER OF TIMES EVALUATION IS MADE:
         NUMBER OF TIMES EVENT IS ESTABLISHED;
STATE 0:
  EVENT 0:623:68;    ⎫
  EVENT 1:68:45;     ⎪
  EVENT 2:578:498;   ⎪
  EVENT 3:498:342;   ⎪
  EVENT 4:236:156;   ⎬ P1
  EVENT 5:156:21;    ⎪
  EVENT 6:215:211;   ⎪
  EVENT 7:211:197;   ⎪
  EVENT 8:197:186;   ⎪
                     ⎪
STATE 1:             ⎪
        :            ⎭

TOTAL:
  EVENT 0:1248:121;  ⎫
  EVENT 1:832:305;   ⎬ P2
        :            ⎪
        :            ⎭
```

FIG. 9

| TRANSITION | Pt(i) OCCURRENCE FREQUENCY | Etf(i) NONOCCURRENCE DETERMINATION TIME | Etf(i) TOTAL EXECUTION TIME |
|---|---|---|---|
| 1 | 7% | 4 | 8 |
| 2 | 55% | 4 | 8 |
| 3 | 3% | 6 | 12 |
| 4 | 30% | 8 | 16 |

FIG. 10

```
STATE 0:

EVENT 2;        ⎫
        EVENT 3;        ⎪
        ACTION 1;       ⎬ TRANSITION 2
        ACTION 2;       ⎪
        NEXT STATE 2;   ⎭

EVENT 2;        ⎫
        EVENT 6;        ⎪
        EVENT 7;        ⎪
        EVENT 8;        ⎬ TRANSITION 4
        ACTION 0;       ⎪
        ACTION 3;       ⎪
        NEXT STATE 4;   ⎭

EVENT 0;        ⎫
        EVENT 1;        ⎪
        ACTION 0;       ⎬ TRANSITION 1
        NEXT STATE 1;   ⎭

EVENT 2;        ⎫
        EVENT 4;        ⎪
        EVENT 5;        ⎪
        ACTION 0;       ⎬ TRANSITION 3
        ACTION 2;       ⎪
        NEXT STATE 3;   ⎭

STATE 1:
                                      Pe(i)
        ⋮                   ESTABLISHMENT FREQUENCY
```

FIG. 11

| EVENT | Pe(i) ESTABLISHMENT FREQUENCY | Ee(i) EXPECTATION VALUE |
|---|---|---|
| 0 | 88% | 2 |
| 1 | 8% | 3 |

FIG. 12

METHOD AND APPARATUS FOR OPTIMIZING STATE TRANSITION TABLE USED FOR EVENT-DRIVEN SOFTWARE

BACKGROUND OF THE INVENTION

The present invention relates to software development support in Computer Aided Software Engineering (CASE) and, more particularly, to a method and apparatus for optimizing a state transition table used in event-driven software.

This application is based on Japanese Patent Application No. 9-172151, filed Jun. 27, 1997, the content of which is incorporated by reference.

An event-driven software which parses a state transition table upon occurrence of an event and invokes a specific action in accordance with the parsing result is a kind of a variety of software programs and realized, e.g., as communication control software or the like at a radio communication terminal.

The state transition table defines a plurality of transitions corresponding to each of a plurality of states. One transition includes at least an event to be established for this transition itself, and information representing a state to which a transition is to be made next.

An event-driven software parses the state transition table as follows upon occurrence of an event. More specifically, when an event occurs in a given state, a plurality of transitions in the state transition table are sequentially loaded. When the occurred event coincides with an event defined in a given one of the transitions sequentially loaded, this given transition is determined as a transition to the next state.

In the event-driven software which parses the state transition table to invoke an action, the structure of the state transition table itself may greatly influence the execution speed of the software. In particular, as the number of transitions or events for each state increases, the execution speed of the whole system is more influenced by the arrangement order of them. A state transition table created on the basis of system specifications is not always optimum from the viewpoint of maximizing the execution speed of a program constituting this system. For this reason, the arrangement order of a plurality of transitions and events defined for each state should be optimized in the state transition table.

However, this optimization is manually performed and cumbersome. In the respective software development stages including an actual working stage, a state transition table cannot be appropriately and easily optimized.

The transition execution frequency can be measured by simulation to determine an optimal order. However, transitions in the state transition table must still be manually rearranged.

BRIEF SUMMARY OF THE INVENTION

The present invention has been made in consideration of the above situation, and has as its object to provide a method and apparatus for optimizing a state transition table used in event-driven software so as to obtain high-speed event-driven software without changing the program size.

It is another object of the present invention to provide a method and apparatus for supporting the development of event-driven software which parses a state transition table to invoke an action, in the respective stages, i.e., the design stage, test stage, and actual working stage.

According to one aspect of the present invention, there is provided a method of optimizing a state transition table used in event-driven software, comprising the steps of: (1) inputting the state transition table; (2) extracting an event; (3) sequentially parsing the state transition table input in step (1) and determining a transition in which the event extracted in step (2) is established; (4) calculating a transition determination history in the state transition table by repeating steps (2) and (3); (5) calculating a transition determination frequency on the basis of the transition determination history; and (6) optimizing a transition arrangement order in the state transition table on the basis of the determination frequency calculated in step (5).

According to the another aspect of the present invention, there is provided a method of optimizing a state transition table used in event-driven software, comprising the steps of: (1) inputting the state transition table; (2) extracting an event; (3) sequentially parsing the state transition table input in the step (1) and determining a transition in which the event extracted in step (2) is established; (4) calculating an event establishment history in the state transition table by repeating steps (2) and (3); (5) calculating an event establishment frequency on the basis of the event establishment history; and (6) optimizing an event arrangement order in the state transition table on the basis of the frequency calculated in step (5).

According to the another aspect of the present invention, there is provided an apparatus for optimizing a state transition table used in event-driven software, comprising: input means for inputting the state transition table; extraction means for extracting an event; determination means for sequentially parsing the state transition table input by the input means and determining a transition in which the event extracted by the extraction means is established; storage means for storing a transition determination history in the state transition table, which is determined by the determination means; calculation means for calculating a transition determination frequency on the basis of the transition determination history; and optimization means for optimizing a transition arrangement order in the state transition table on the basis of the determination frequency calculated by the calculation means.

According to the another aspect of the present invention, there is provided an apparatus for optimizing a state transition table used in event-driven software, comprising: input means for inputting the state transition table; extraction means for extracting an event; determination means for sequentially parsing the state transition table input by the input means and determining a transition in which the event extracted by the extraction means is established; storage means for storing an event establishment history in the state transition table, which is determined by the determination means; calculation means for calculating an event establishment frequency on the basis of the event establishment history; and optimization means for optimizing an event arrangement order in the state transition table on the basis of the frequency calculated by the calculation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flow chart for explaining the optimization processing operations of a state transition table based on information collected by processing execution in the parsing and program invoking portion;

FIG. 4 is a view showing the description definitions by BNF in the state transition table;

FIG. 5 is a view showing the description contents of the state transition table;

FIG. 6 is a view showing transition evaluation information output from the parsing and program invoking portion;

FIG. 7 is a view showing event establishment information output from the parsing and program invoking portion;

FIG. 8 is a view showing the storage of the transition evaluation information in a state transition frequency database;

FIG. 9 is a view showing the storage of the event establishment information in an event establishment frequency database;

FIG. 10 is a view showing sum results (Pt(i), Etf(i), Ett(i)) in the respective transitions, "transition 1" to "transition 4" of "state 0" based on the transition evaluation information and the event establishment information;

FIG. 11 is a view showing a state transition table optimized upon optimizing the state transition table in FIG. 5;

FIG. 12 is a view showing a sum result (Pe(i), Ee(i)) in "transition 1" of "state 0", on the basis of the transition evaluation information and the event establishment information.

DETAILED DESCRIPTION OF THE INVENTION

The embodiment of the present invention will be described in detail with reference to the accompanying drawing.

This embodiment is related to a system combined with event-driven software which parses a state transition table to invoke an action, thereby optimizing the state transition table.

Figure 1:
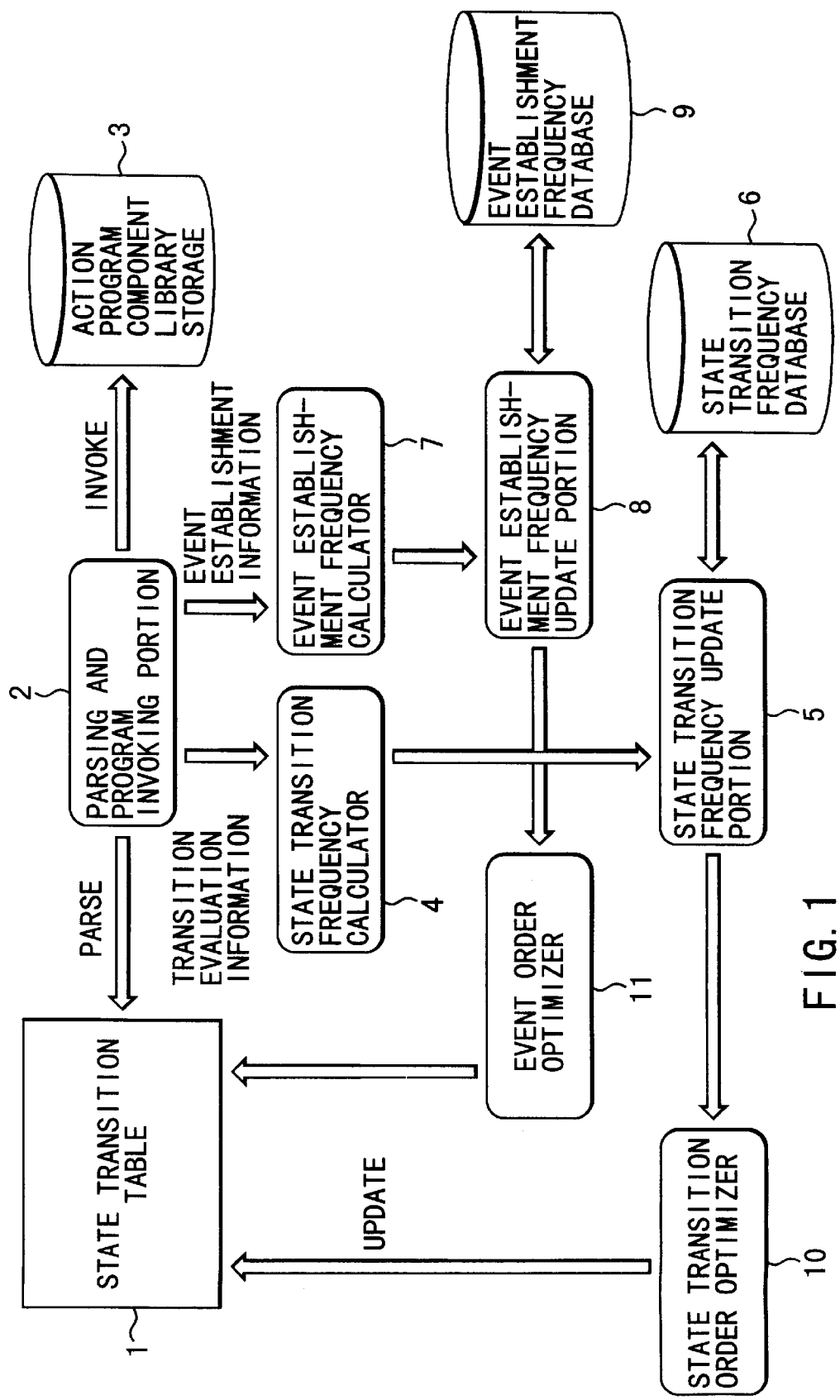
FIG. 1 is a block diagram showing the schematic arrangement of a system according to an embodiment of the present invention.

FIG. 1 is a block diagram showing the schematic arrangement of this embodiment. This system comprises a state transition table 1, a parsing and program invoking portion 2, an action program component library storage 3, a state transition frequency calculator 4, a state transition frequency update portion 5, a state transition frequency database 6, an event establishment frequency calculator 7, an event establishment frequency update portion 8, an event establishment frequency database 9, a state transition order optimizer 10, and an event order optimizer 11.

Figure 2:
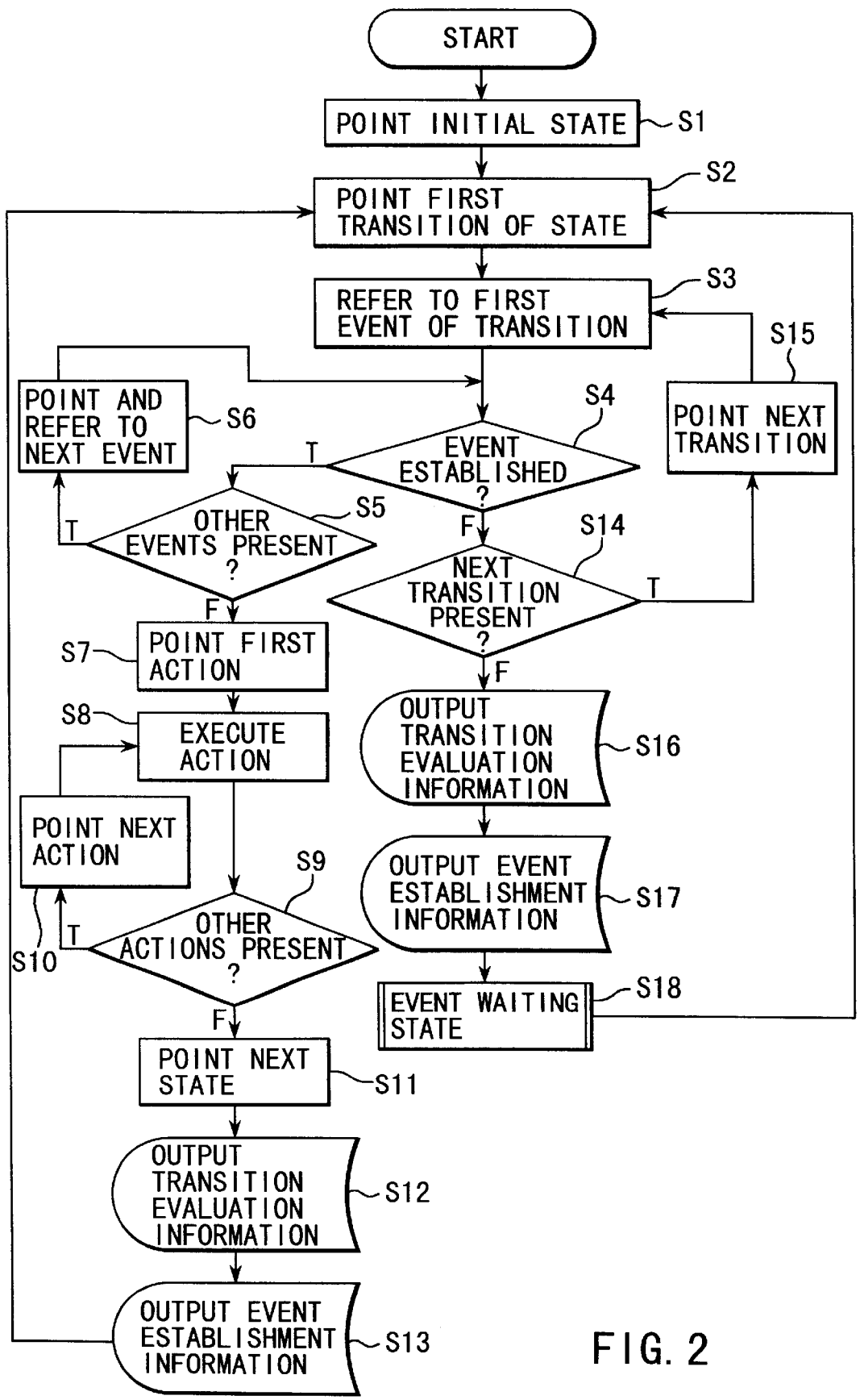
FIG. 2 is a flow chart for explaining the processing operations of a parsing and program invoking portion.

The event-driven software of this system parses the state transition table 1 prepared in advance to invoke action components stored in the action program component library storage 3, FIG. 2 is a flow chart for explaining the operations of the parsing and program invoking portion 2. FIG. 3 is a flow chart for explaining the optimization processing operations for the state transition table on the basis of frequency information collected by the processing execution of the parsing and program invoking portion 2. FIG. 4 shows Buckus-Naur Form (BNF) description definitions, and FIG. 5 shows the state transition table in detail.

The event-driven software of this embodiment parses the state transition table in FIG. 5 described in accordance with, e.g., the description definitions shown in FIG. 4 to invoke the program components corresponding to actions.

The state transition table shown in FIG. 5 is parsed in accordance with the sequence shown in FIG. 2.

The parsing sequence of the state transition table shown in FIG. 5 will be described with reference to the flow chart in FIG. 2.

When the system is in "state 0", the four transitions of "state 0" are sequentially evaluated. The parsing and program invoking portion 2 points "event 0" as the first event of the first transition (steps S1 to S3). If "event 0" is true, "event 1" is then pointed (steps S4 to S6). If "event 1" is also true, "transition 1" is determined as a transition to the next state, and processing described in "action 0" is executed (steps S8 to S10), then the state transits to the next state "state 1". If one of the events is false in step S4, the flow advances to the steps of evaluating the next transition (steps S14 and S15). This processing is repeated until no more transitions to be evaluated are present.

When the state transition is determined in steps S2 to S10, the point shifts to the next state (step S11). At this time, the parsing and program invoking portion 2 outputs the state evaluation information and the event establishment information, respectively, to the state transition frequency calculator 4 and the event establishment frequency calculator 7 (steps S12 and S13). The flow returns to step S2, and the same operations as described above are repeated for "state 1". When an event is not established in step S4, and the next transition is present, the point shifts to this transition. Event establishment is confirmed to execute this transition (steps S14 and S15 and steps S3 and S4). If no transition candidates to be determined are present in step S14, the parsing and program invoking portion 2 outputs the transition evaluation information and the event establishment information, respectively, to the state transition frequency calculator 4 and the event establishment frequency calculator 7 (steps S16 and S17) and waits for the next event (step S18).

As described above, the parsing and program invoking portion 2 parses the state transition table 1, and confirms the presence/absence of event establishment from the first transition in the initial state. If event establishment is confirmed, the corresponding action is executed, and the state transits to the next state. In addition to this parsing operation of the transition table, the parsing and program invoking portion 2 comprises an interface for externally providing transition evaluation information and event establishment information.

Before the parsing and program invoking portion 2 waits for the next event (steps S16 and S17) in the absence of any further transition to be determined, as shown in step S18 and when a given transition is detected to shift the current state to the next state (steps S12 and S13), state transition evaluation information and event establishment information are externally output. The output operations of these pieces of information are exemplified in FIGS. 6 and 7, respectively.

As shown in FIG. 6, the transition evaluation information is recorded with the ID of a state to be evaluated (e.g., "state 0" in FIG. 5), an evaluated state transition (e.g., "transition 1" and "transition 2" in FIG. 5), and its evaluation result (OK/NG). For example, in the state of the transition to be evaluated, i.e., "state 0", the first transition ("transition 1") is not established, but the second transition ("transition 2") is established.

As shown in FIG. 7, the event establishment information is recorded with events subjected to evaluate (e.g., "event 0", "event 1", "event 2", and "event 3"), and their establishment results (True/False). According to the records of FIG. 7, "event 0", "event 2", and "event 3" are true, while "event 1" is false.

As described above, the transition evaluation information and the event establishment information are sequentially transmitted to the state transition frequency calculator 4 and the event establishment frequency calculator 7 during the execution of the event-driven software.

The optimization processing operations for the state transition table based on the information collected in the processing execution of the parsing and program invoking portion 2 will be described with reference to the flow chart in FIG. 3.

The transition evaluation information and event establishment information output from the parsing and program invoking portion 2 are respectively collected by the state transition frequency calculator 4 and the event establishment frequency calculator 9 and are used to update the corresponding databases 6 and 9 (steps S21 to S23).

FIG. 8 shows an example of transition evaluation information stored in the state transition frequency database 6. FIG. 9 shows an example of event establishment information stored in the event establishment frequency database 9.

As shown in FIG. 8, information stored in the state transition frequency database 9 is a group of transitions belonging to each state. For example, in FIG. 8, "state 0" has been subjected to evaluation 623 times. In this case, "transition 1" is determined 45 times and; "transition 2", 342 times. The frequency information is stored in the state transition frequency database 6. When the transition evaluation information shown in FIG. 6 is generated, the total number of times "state 0" is determined is updated to 624, and the number of times "transition 2" is established is updated to 343.

As shown in FIG. 9, information stored in the event establishment frequency database 9 is constituted by a state, a field P1 representing a group of all events that may be established in this state, and a field P2 representing all the events that may be established in the system. For example, in FIG. 9, the field P1 stores information of nine events which can be established in "state 0". The numbers of times each event is evaluated and established are recorded. The field P2 records the total numbers of times each event is evaluated and established in the entire system. When the event establishment information shown in FIG. 7 is received, the number of times of evaluation in "state 0" and the total number of times of evaluation for each event in the field P2 are incremented by one each for "event 0", "event 1", "event 2", and "event 3" stored in the field P1. The number of times of establishment is also updated for "event 0", "event 2", and "event 3" in the field P1.

The state transition table is optimized at a predetermined timing on the basis of the information stored in the state transition frequency database 6 and the event establishment frequency database 9 (steps S25 to S27 in FIG. 3). As an example of optimization, optimization of the parsing speed for the state transition table will be described below. That is, the arrangement orders of transitions and events in the state transition table 1 are determined so as to minimize the parsing time based on the state transition table 1 in the parsing and program invoking portion 2 and more specifically so as to determine a transition having a higher determination frequency earlier than a transition having a lower determination frequency, and so as to establish an event having a higher establishment frequency earlier than an event having a lower establishment frequency.

The following values are defined in a given state of the state transition table:

Pt(i): occurrence frequency of transition i, which is; "number of times transition i is determined"/"total number of times state is evaluated";

Etf(i): expectation of nonoccurrence determination time of transition i; and

Ett(i): total execution time of transition i (execution time logically obtained as (number of steps of each event evaluation required for a transition i)×(total sum of cycle time)).

Using these values, the expectation of the time until the ith transition is determined is given by:

$$\sum_{k=1}^{i-1} Etf(k) + Ett(i) \tag{1}$$

The probability that the ith transition is established is:

$$\left\{ \prod_{j=1}^{i-1} (1 - Pt(j)) \right\} Pt(i) \tag{2}$$

Therefore, the expectation of the time required to determine a transition in a given state is expressed by:

$$\sum_{i=1}^{n} \left\{ \prod_{j=1}^{i-1} (1 - Pt(j)) \right\} Pt(i) \left\{ \sum_{k=1}^{i-1} Eft(k) + Ett(i) \right\} + \left\{ \prod_{j=1}^{n} (1 - Pt(j)) \right\} \sum_{k=1}^{n} Eft(k) \tag{3}$$

Optimization for each state can be done by obtaining the transition arrangement order which minimizes the value of expression (3).

The following values can be defined when a given transition is taken as an example:

Pe(i): establish frequency of event i, which is; "number of times event i is established"/"number of times event i is determined";

Ee(i): expectation defined in execution of the given transition; and n: number of events defined in execution of the given transition.

By using these values, the probability that a given transition fails because ith event is false is expressed as:

$$\left(\prod_{j=1}^{i-1} Pe(j)\right)(1 - Pe(j)) \qquad (4)$$

Etf(i), the expectation of the nonoccurrence determination time of the given transition i, which represents the time for determining a failure of a given transition, is expressed by:

$$Eft(i) = \sum_{i=1}^{n} \left(\prod_{j=1}^{i-1} Pe(j)\right)(1 - Pe(j))\left(\sum_{k=1}^{i} Ee(k)\right) \qquad (5)$$

Optimization for each transition is done by obtaining the event arrangement order for minimizing the above value.

As for events, numbers of times of evaluation and establishment are added up in two ways, i.e., per each state and the entire system, and can be selectively used for application purposes.

Optimization of the state transition table will be described in more detail.

Sum results (Pt(i), Etf(i), Ett(i)) for the respective transitions, "transition 1" to "transition 4" of "state 0" on the basis of the transition evaluation information and event establishment information respectively stored in the state transition frequency database 6 and the event establishment frequency database 9 are shown in FIG. 10. The expectation of the determination time of "state 0" is "10.6" from the values in FIG. 10 and expression (3). The transitions are ordered to minimize the determination time on the basis of the data in FIG. 10. The values of expression (3) are sequentially obtained for all the combinations of "transitional" to "transition 4". The transition order that minimizes the value of expression (3) is "transition 2", "transition 4", "transition 1", and "transition 3". At this time, the expectation of the determination time is "7.8", thereby reducing the determination time by a little less than 30%.

The sum results (Pe(i), Ee(i)) for "transition 1" of "state 0" based on the transition evaluation information and event establishment information respectively stored in the state transition frequency database 6 and the event establishment frequency database 9 are shown in FIG. 12. The expectation of the nonoccurrence determination time of "transition 1" in the event order (i.e., the order of "event 0" and "event 1") in FIG. 11 can be obtained as "4.3" from the values in FIG. 12 and equation (5). The event order for minimizing the determination time is obtained on the basis of the data in FIG. 12. The values of equation (5) are sequentially obtained for all the combinations of, e.g., "event 0" and "event 1". The event order that minimizes the value of equation (5) is "event 1" and "event 0". The expectation of the nonoccurrence determination time is "2.8", thereby reducing the nonoccurrence determination time by a little more than 30%.

An application example in which the state transition table optimization technique described above is used in the software design stage will be described below. When only the state transition table is obtained in the design stage, evaluation information for a state transition and establishment information for an event are collected using an event establish sequence taking actual working into account. Frequency information is calculated using these pieces of information, and the state transition table can be optimized in accordance with the above-described guideline. According to this method, an optimal state transition table can be automatically obtained even if the designer is not aware of specific portions of the state transition table which are executed with specific frequencies.

An application example in which the above state transition table optimizing technique is used in the software test stage will be described below. When a test software system is obtained in the test stage, the state transition table is stored in a programmable storage medium such as an SRAM, and a system identical to that in FIG. 1 is constructed. Transition evaluation information and event establishment information are gathered while test items taking the actual use environment into account are tested. By using these pieces of information, the state transition table can be optimized. That is, while the designed software system is tested, the execution speed can be automatically tuned.

In the actual software working stage as well, the state transition table is set rewritable, and the execution speed of the system can be dynamically tuned in accordance with the working environment, period, and situation.

The timing at which the state transition table optimization processing shown in FIG. 3 is performed for the state transition table 1 will be briefly described. For example, no problem is posed if the state transition table is updated at any timing in the design stage. Optimization should not be performed in a test stage in which a test requiring constant performance is conducted. In this case, the operations of the portions associated with optimization processing in FIG. 1 (e.g., the state transition frequency update portion 5, the state transition frequency database 6, the event establishment frequency update portion 8, the event establishment frequency database 9, the state transition order optimizer 10, and the event order optimizer 11) must be controlled.

In the actual working stage, in addition to the above constraints, the period for measuring frequency information must be limited. Alternatively, optimization must be performed at timings free from any influence on the operation of the system in accordance with information obtained within a predetermined latest period while information older than that obtained within a predetermined period is deleted. To meet the requirements described above, the portions associated with the optimization processing in FIG. 1 must have the following functions:

reception of an optimization processing execution request;

periodic execution of optimization processing;

automatic optimization at a timing when the optimized table must be updated;

periodic and automatic stop of optimization processing;

updating of frequency information; and determination of whether state transition table is updated.

The above functions can be easily realized as follows. A user interface for receiving settings of these functions and instruction requests and displaying a variety of messages is added to the system shown in FIG. 1, and the respective portions in FIG. 1 are controlled based on the data input through this user interface.

Figure 13:
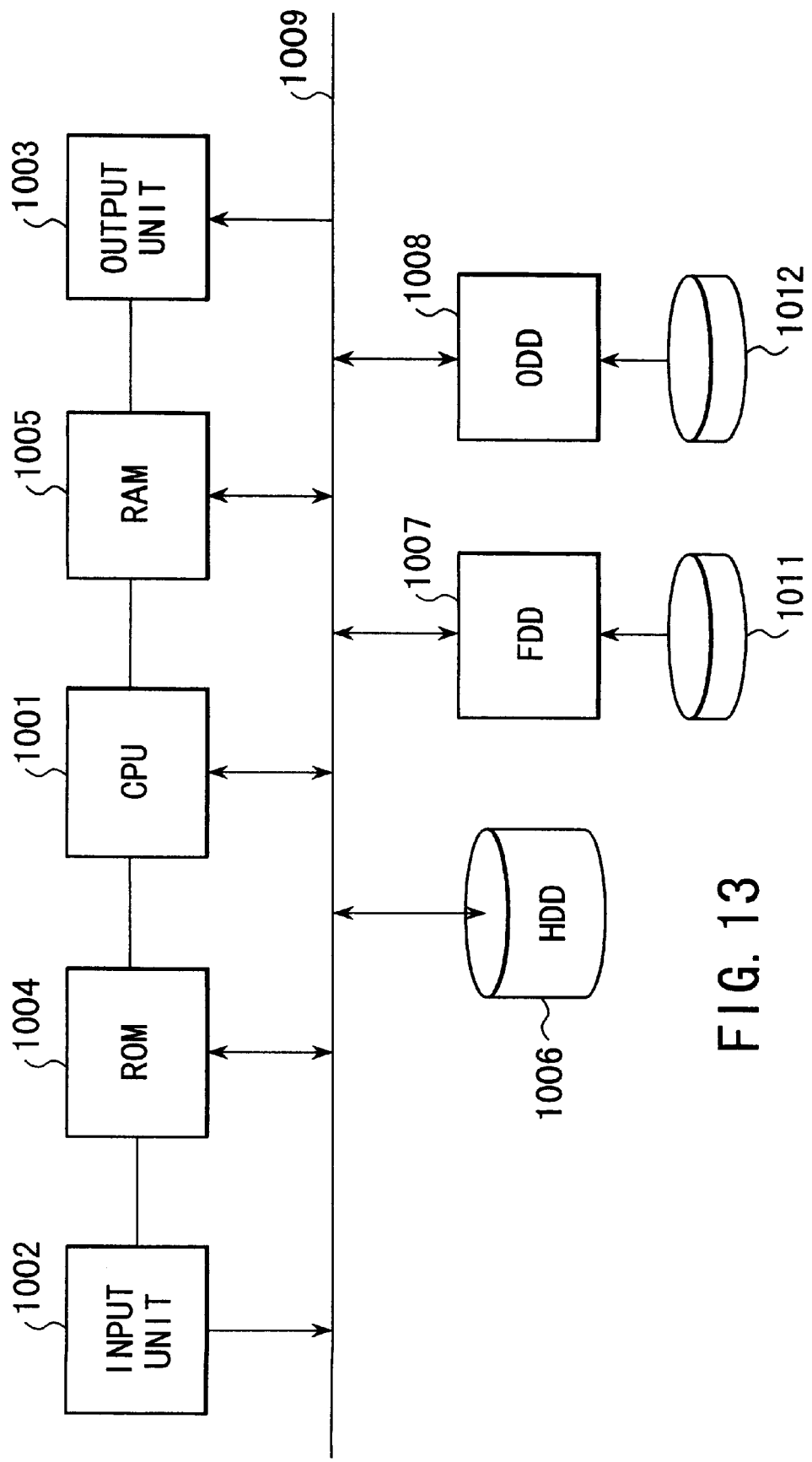
FIG. 13 is a block diagram showing the configuration of a computer system for realizing a method of optimizing a state transition table according to the present invention shown in FIGS. 2 and 3.

FIG. 13 shows the hardware arrangement of a computer system for implementing the state transition table optimizing method (FIGS. 2 and 3) according to the present invention. This computer system comprises, e.g., a personal computer. In the personal computer, a CPU 1001 for controlling arithmetic processing, an input unit 1002 such as a keyboard, a pointing device, and a microphone, and an output unit 1003 such as a display and loudspeakers, a ROM 1004 and a RAM 1005 serving as a main memory, and a hard disk drive 1006, a floppy disk drive 1007, and an optical disk 1008 serving as external storages are connected to each other through a bus 1009.

A program for executing the state transition table optimization processing shown in FIGS. 2 and 3 and the state transition table are stored in any one of the storage media, i.e., the hard disk drive 1006, the floppy disk drive 1007, and the optical disk drive 1008. The state transition table stored in the recording medium (the table may be stored in the ROM 1004 or RAM 1005 serving as the main memory) is optimized in accordance with this program, and the optimized state transition table is stored in the recording medium again. In this manner, the present invention can be practiced using a general personal computer.

As described above, according to this embodiment, while the parsing and program invoking portion 2 parses the state transition table 1, state transition evaluation information for each state and event establishment information for each event are gathered and recorded as histories (they are stored in the state transition frequency database 6 and the event establishment frequency database 9). The state transition order optimizer 10 and the event order optimizer 11 determine the arrangement order of transitions to another state and the arrangement order of events (update the state transition table 1) such that the transition time from each state calculated on the basis of the recorded state transition history and event establish history is minimized. In the respective stages, i.e., the design, test, and actual working stages, in developing a software system for parsing the state transition table to invoke an action, an efficient transition arrangement order and event order are determined while gathering the transition execution frequency and event establishment frequency, thereby optimizing the state transition table 1. More specifically, the table elements of the optimized table are rearranged to allow design and manufacture of a higher-speed software system.

As has been described above, according to the present invention, in the various stages in developing a software system for parsing a state transition table to invoke an action, the state transition table can be appropriately and easily optimized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of optimizing a state transition table in which, for each state of the state transition table, a plurality of transitions prepared in accordance with establishment of events are arranged in a predetermined arrangement order, said method comprising:

establishing events associated with each said state and evaluating each event established as to each said state to thereby obtain evaluation information;

determining state transition frequency information with respect to each said state from the evaluation information, wherein the state transition frequency information includes information regarding a number of times the evaluating step is performed in said each state and a number of times the determining state transition frequency information step is performed in said each state;

calculating an expectation of a time period required for a transition determining operation for determining one of the transitions which corresponds to the each event established in said each state from the state transition frequency information; and optimizing the state transition table on the basis of the expectation.

2. The method according to claim 1, wherein the transition frequency in said each state is calculated on the basis of the number of times the evaluating step is performed in said each state and the number of times the determining state transition frequency information step is performed in said each state.

3. The method according to claim 2, wherein in said each state during the evaluating step, the predetermined arrangement order is changed such that the transitions are arranged in a descending order of a transition frequency, whereby the transitions are evaluated from one of the transitions which has a highest transition frequency.

4. A method of optimizing a state transition table in which, for each state of the state transition table, a plurality of transitions prepared in accordance with establishment of events are arranged in a predetermined arrangement order, said method comprising:

establishing events associated with each said state and evaluating each event established as to each said state to thereby obtain event establishment frequency information with respect to said each state, wherein the event establishment frequency information includes information regarding a number of times said event evaluating step is performed and a number of times a firer event determining operation for determining an event is performed;

calculating an expectation of a time period required to determine that no event is established and a transition is failed in said each state from the event establishment frequency information; and optimizing the state transition table on the basis of the expectation.

5. The method according to claim 4, wherein an event establishment frequency in each of the transitions is calculated on the basis of the number of times the event evaluating step and the number of times the event determining operation are performed.

6. The method according to claim 5, wherein in said each transition during evaluating, an arrangement order of the events is changed such that the events are arranged in a descending order of event establishment frequency, whereby the events are evaluated from one of the events which has a highest event establishment frequency.

7. An apparatus for optimizing a state transition table, comprising:

a state transition table indicating a plurality of transitions prepared in accordance with establishment of events in each state of the state transition table and arranged in a predetermined arrangement order in said each state;

input means for inputting an event established;

evaluating means for performing an evaluation operation for evaluating the state transition table on the basis of the event input by the input means to thereby obtain state transition frequency information with respect to said each state, wherein the state transition frequency information includes information regarding a number of times the evaluation operation is performed in said each state and a number of times the state transition frequency obtaining is performed in said each state;

calculation means for calculating an expectation of a time period required for a transition determining operation for determining one of the transitions which corresponds to the event established in said each state from the state transition frequency information; and optimization means for optimizing the state transition table on the basis of the expectation calculated by the calculation means.

8. The apparatus according to claim 7, wherein the calculation means calculates a transition frequency in said each state on the basis of the number of times of the evaluation operation and the number of times the state transition frequency is obtained.

9. The apparatus according to claim 8, wherein the optimization means updates the predetermined arrangement order in said each state and the predetermined arrangement order is changed such that the transitions are arranged in a descending order of transition frequency, whereby the transitions are evaluated from one of the transitions having a highest transition frequency.

10. An apparatus for optimizing a state transition table, comprising:

a state transition table indicating a plurality of transitions which are prepared in accordance with establishment of events in each state of the state transition table, and which are arranged in a predetermined arrangement order in said each state;

input means for inputting an event established;

evaluating means for performing an evaluation operation for evaluating the state transition table on the basis of the event input by the input means to thereby obtain event establishment frequency information with respect to each of the transitions, wherein the event establishment frequency information includes information regarding a number of times an event evaluating operation for evaluating an event is performed in said each transition and a number of times an event determining operation for determining an event is performed in said each transition;

calculation means for calculating an expectation of a time period required for determining that no event is established and said each transition is failed from the event establishment frequency information; and optimization means for optimizing the state transition table on the basis of the expectation calculated by the calculation means.

11. The apparatus according to claim 10, wherein the calculating means calculates an event establishment frequency for said each transition on the basis of the number of times of the event evaluating operation and the number of times of the event determining operation.

12. The apparatus according to claim 11, wherein the optimization means updates an arrangement order of the events such that the events are arranged in a descending order of event establishment frequency, whereby the events are evaluated from one of the events which has a highest event establishment frequency, when the checking operation is performed.

* * * * *